United States Patent [19]
Caesar et al.

[11] 4,297,252
[45] Oct. 27, 1981

[54] AGING-RESISTANT FIREPROOFING MATERIAL

[75] Inventors: Arndt C. Caesar, Frankenthal; Wolfram Koegel, Manneheim; Ludwig Zuern, Bad Durkheim; Friedheim Gaertner, Worms, all of Fed. Rep. of Germany

[73] Assignee: BASF Aktiengesellschaft, Fed. Rep. of Germany

[21] Appl. No.: 41,521

[22] Filed: May 22, 1979

[30] Foreign Application Priority Data

Jun. 24, 1978 [DE] Fed. Rep. of Germany ....... 2827828

[51] Int. Cl.³ .......................... C09D 5/18; C09K 3/28
[52] U.S. Cl. ................................. 252/606; 106/18.12; 106/75; 428/921
[58] Field of Search ............................. 252/8.1, 606; 106/18.12, 75

[56] References Cited

U.S. PATENT DOCUMENTS

| 2,047,016 | 7/1936 | Elias | 106/18.12 |
| 3,259,536 | 7/1966 | Gaeth et al. | 106/18.11 X |
| 3,498,807 | 3/1970 | Gresham | 106/74 |
| 4,036,655 | 7/1977 | Yamada et al. | 106/77 |
| 4,064,317 | 12/1977 | Fukuba et al. | 252/8.1 X |

FOREIGN PATENT DOCUMENTS

| 2300724 | 7/1974 | Fed. Rep. of Germany | 106/75 |
| 2212826 | 7/1974 | France | 106/75 |
| 944133 | 12/1963 | United Kingdom | 106/18.12 |
| 1051078 | 12/1966 | United Kingdom | 106/18.12 |
| 1269857 | 4/1972 | United Kingdom | 106/84 |

Primary Examiner—Richard D. Lovering
Attorney, Agent, or Firm—Keil & Witherspoon

[57] ABSTRACT

A fireproofing material based on alkali metal silicates and containing from 20 to 60 percent by weight of water, which additionally contains from 1 to 10 percent by weight of a borate or an aluminate, preferably sodium aluminate, to improve the aging resistance. The fireproofing material can be used to insulate apertures and passages in building structures against the passage of fire and smoke, and can also be used as a fireproof glass.

1 Claim, No Drawings

AGING-RESISTANT FIREPROOFING MATERIAL

The present invention relates to a fireproofing material based on hydrated alkali metal silicate which contains added borates or aluminates to improve the aging resistance.

Fireproofing materials consisting of hydrated alkali metal silicates have long been known and are already extensively employed for preventative fire protection. At high temperatures, which arise, for example, in case of fire, these materials provide excellent insulation against fire and smoke, as a result of foaming up, increasing in volume and generating a foaming pressure, and thus seal apertures and passages in building structures. Such materials, and processes for their preparation, are described in U.S. Pat. No. 3,259,536, British Pat. No. 944,133 and British Pat. No. 1,051,078.

These fireproofing materials are being used in an increasing number of fields, so that the material has to meet constantly new and more severe requirements. Thus, the materials can be sealed in a wrapping which is impermeable to water vapor. If the materials' wrapped in this way are exposd to an elevated temperature, the moisture equilibrium between the materials and the surrounding air can no longer be reached. We have found that under these conditions the effectiveness of the fireproofing materials declines, for example after a few weeks' storage at 80° C., the time depending on the temperature. The decreasing activity manifests itself in a lower increase in volume during foaming.

It is the object of the present invention to counteract this decrease in foaming power of the fireproofing material on prolonged storage at elevated temperatures, and substantially to suppress the decrease by adding suitable adjuvants. We have found that this object is achieved by using a fireproofing material which comprises:

A. 99–90 percent by weight of an alkali metal silicate containing 20–60 percent by weight of water and
B. 1–10 percent by weight of a borate or aluminate.

The alkali metal silicates A are described in detail in the publications cited above. Their water content is preferably from 25 to 40 percent by weight. Sodium silicate having a molar ratio $Na_2O:SiO_2$ of from 1:1 to 1:6, preferably from 1:2.5 to 1:4, is particularly suitable.

Examples of suitable adjuvants B are boric acid, borax and alkali metal aluminates, especially sodium aluminate, which is preferably added in an amount of from 2 to 6 percent by weight, based on the sum of A+B. If aluminate ions and silicate ions encounter one another in an aqueous system, aluminosilicates (zeolites) can form. These can of course also be employed directly, in the preproduced form, as adjuvants B.

In addition, the fireproofing materials according to the invention can contain conventional adjuvants, such as wetting agents, eg. sodium sulfonate, foaming assistants, eg. carbohydrates or cellulose powders, which in case of fire form a carbon skeleton, pigments and dyes, and reinforcing agents, eg. mineral, metal or textile fibers, fabrics or nets. The preferred reinforcing agent is glass fibers, which are added in an amount of from 2 to 20 percent by weight, based on the sum of A+B.

The fireproofing material according to the invention is prepared by adding the borates or aluminates B to an aqueous suspension of the alkali metal silicate A and drying the composition until it reaches the desired water content, thereby solidifying it. It has proved particularly efficient to distribute component B, in a very fine form, very homogeneously in component A. Depending on the stage of the manufacturing process of the alkali metal silicate suspension at which component B is added to this suspension, component B may be added as a solid, an aqueous solution or an aqueous suspension. For example, component B can be directly introduced into the finished aqueous alkali metal silicate suspension, by swirling. It is however also possible, when preparing the alkali metal silicate suspension by mixing an alkali metal silicate powder with an alkali metal silicate solution, to add component B, as a solid or solution, respectively to the powder or to the solution. The further adjuvants, if any, can similarly be added in a suitable manner.

The fireproofing material according to the invention can, in the conventional manner, be cut into strips or webs, be dusted with release agents, for example talc, be provided with coatings, for example finishes based on epoxy resins, polyvinyl chloride or polyurethanes, and be wrapped with plastic films or metal foils, for example aluminum foils.

The fireproofing materials are used for insulating apertures and passages in building structures against the passage of fire and smoke, and are also used as a fireproofing glass. They are distinguished by particularly good resistance to aging, and their effect remains undiminished even after a very long period of use.

In the Examples, parts and percentages are by weight. The foaming characteristics of the fireproofing material were selected as a criterion of the effectiveness of the additives. To carry out these tests, fireproofing strips of size 100×200×2 mm were heated for 5 minutes at 600° C. in a muffle furnace. The thickness of the resulting foam (which decreases with increasing length of storage of the strips at 95° C.), and the period of storage required to cause the foam thickness to fall to half, were measured.

The percentage increase in this period, achievable by adding the aluminate or borate, compared to the period for a fireproofing strip without such an adjuvant, is recorded.

EXAMPLE 1

A standard sodium silicate suspension was prepared by mixing 100 parts of a sodium silicate solution (35% solids content) with 32 parts of sodium silicate powder (82% solids content). In various experiments, the following amounts of sodium aluminate powder were added to this suspension, and thoroughly mixed therewith.

| Experiment | Parts |
| --- | --- |
| 1 | 0 |
| 2 | 2.5 |
| 3 | 3.7 |
| 4 | 4.9 |

0.2 kg/m² of chopped glass fibers was sprinkled on an endless belt and 4.5 kg/m² of the various suspensions were then applied. The mixtures were heated on the endless belt to about 90° C. by means of infrared radiators (period of exposure: about 4 minutes); this gelled the mixtures and subsequently dried them to a residual moisture content of 32%. Test strips were cut from the material and were sealed in water vapor-impermeable aluminum laminate wraps. The wrapped strips were stored at 95° C.; their water content did not change. At certain intervals, the test strips were taken from the storage chamber and the foam height was determined.

The following results were obtained:

| Experiment | Content of sodium aluminate (based on A + B) | Percentage increase in time |
| --- | --- | --- |
| 1 | 0 | 100 (reference value) |
| 2 | 2.6 | 360 |
| 3 | 4.0 | 500 |
| 4 | 5.2 | 430 |

EXAMPLE 2

Various amounts of a 50 percent strength aqueous potassium aluminate solution were added to the standard sodium silicate suspension of Example 1. The suspension was poured into plastic molds, glass fibers were added and the mass was gelled and dried to a residual moisture content of 32%. The test specimens were treated as in Example 1 and the increase in the period for which they remained foamable was measured.

| Experiment | Content of potassium aluminate (based on A + B) | Percentage increase in time |
| --- | --- | --- |
| 1 | 0 | 100 |
| 2 | 1.2 | 200 |
| 3 | 2.6 | 370 |
| 4 | 4.0 | 430 |

EXAMPLE 3

200 g/m² of glass fibers chopped to a length of 50 mm were spread continuously over a plane, endlessly revolving belt. 1,230 g/m² of a sodium silicate powder having a solids content of 84% were sprinkled on top of the glass fibers by means of a roller dispenser. This powder mixture was then impregnated uniformly with 1,760 g/m² of a suspension which had been prepared from 1,200 parts of sodium silicate solution of 35% solids content, 400 parts of sodium silicate powder of 84% solids content, 107 parts of sodium aluminate powder and 53 parts of water.

The composition was irradiated for 3 minutes with an infrared lamp and was thereby gelled at 90° C. and brought to a residual water content of 36%. The sodium aluminate content of the finished fireproofing material was 3.6% (based on A+B). The material was treated as in the preceding Examples; the measured foam heights indicated that the foamability was prolonged by 500%, relative to a comparative sample which did not contain any sodium aluminate.

EXAMPLE 4

Sample sheets were prepared in plastic molds similarly to Example 2, the amount of boric acid powder added to the standard suspension being such that the finished sheets, after drying to a residual water content of 32%, contained 4% of boric acid. The percentage extension of the period required for the foamability to decrease to the point where the foam thickness was halved was 400% compared with sheets which did not contain the additive.

EXAMPLE 5

400 g of sodium silicate solution of 35% solids content are mixed with 40 g of sodium aluminate powder of 98% solids content. A vigorous exothermic effect occurs, and an initially viscous and subsequently solid gelled mass is produced, which cools for about 2 hours at room tem-room temperature, during which time the reaction to sodium aluminum silicate goes to completion.

This gelled material is mixed by vigorous stirring with 400 g of sodium silicate solution of 35% solids content and 270 g of sodium silicate powder of 82% solids content, 40 g of glass fibers are added, and the mixture is shaped to form a sheet of size 500×500×2 mm. The test sheets cut from the sheet after the latter has dried to about 33% residual water content are subjected to the heat treatment described in the preceding Examples, and are then tested. The effectiveness of the additive is found to be 300%, on comparison with samples without the additive.

EXAMPLE 6

100 g of sodium aluminum silicate (zeolite) of 88% solids content and 400 g of sodium silicate powder of 82% solids content are mixed into 1,200 g of sodium silicate solution of 35% solids content. This composition, together with 60 g of glass fibers, is shaped in plastic molds to give 3 mm thick sheets, which are dried to a residual water content of about 35%. After high temperature storage as described in Example 1, a test shows that the increase in the period for which the sheets can be stored before the foam thickness falls to less than 50% of the original value is 350% compared with sample sheets without this stabilizing additive.

We claim:
1. A fireproofing material which retains excellent foaming properties on aging and which comprises
   (A) 99–90 percent by weight of an alkali metal silicate containing 20–60 percent by weight of water;
   (B) 1–10 percent by weight of an aluminate; and
   (C) 2–20 percent by weight, based on the sum of A+B, of glass fibers.

* * * * *